United States Patent [19]

Barna

[11] Patent Number: 5,211,057
[45] Date of Patent: May 18, 1993

[54] NOZZLE DIFFUSER FOR USE WITH AN OPEN TEST SECTION OF A WIND TUNNEL

[75] Inventor: P. Stephen Barna, Norfolk, Va.

[73] Assignee: The United States of America as represented by the United States National Aeronautics and Space Administration, Washington, D.C.

[21] Appl. No.: 743,468

[22] Filed: Aug. 8, 1991

[51] Int. Cl.$^5$ .................................. G01M 9/00
[52] U.S. Cl. ........................................ 73/147
[58] Field of Search ................................ 73/147

[56] References Cited

U.S. PATENT DOCUMENTS

| | | | |
|---|---|---|---|
| 3,353,405 | 11/1967 | Ferri | 73/147 |
| 3,431,777 | 3/1969 | Norfleet | 73/147 |
| 3,638,483 | 2/1972 | Shouman | 73/147 |
| 3,739,634 | 6/1973 | Johnson et al. | 73/147 |
| 3,782,189 | 1/1974 | Evans | 73/147 |
| 4,112,568 | 9/1978 | Hale | 29/157 |
| 4,513,610 | 4/1985 | Nelander | 73/147 |
| 4,593,558 | 6/1986 | Barske | 73/147 |
| 4,770,031 | 9/1988 | Roth et al. | 73/147 |

*Primary Examiner*—Donald O. Woods
*Attorney, Agent, or Firm*—Kevin B. Osborne

[57] ABSTRACT

The nozzle diffuser has an inlet in fluid communication with the narrowed inlet of an open test chamber in a conventional wind tunnel. The nozzle diffuser has a passageway extending from its inlet to an outlet in communication with the open test section. The passageway has an internal cross-sectional area which increases from its inlet to its outlet and which may be defined by top and bottom isosceles trapezoid walls of a particular flare angle and by isosceles trapezoid side walls of a different flare angle. In addition, a collector having a decreasing internal cross-sectional area from inlet to outlet may be provided at the opposite end of the test chamber such that its outlet is in fluid communication with a diffuser located at this outlet.

14 Claims, 5 Drawing Sheets

NOZZLE DIFFUSER FOR USE WITH AN OPEN TEST SECTION OF A WIND TUNNEL

ORIGIN OF THE INVENTION

The invention described herein was made in the performance of work under a NASA Contract. In accordance with 35 U.S.C. 202, the contractor elected not to retain title.

BACKGROUND OF THE INVENTION

1. Technical Field of the Invention

The present invention relates generally to wind tunnels and more particularly to a nozzle diffuser for use with the open test section of wind tunnels.

2. Discussion of the Related Art

A conventional wind tunnel operating with an open test section comprises a contracted tunnel section for supplying the air or other gas jet stream to the inlet end of the open test section. The contracted section, frequently called the contraction, is designed for accelerating the gas or air before it enters the open test section. After traversing the length of the open test section, the flow is then directed toward a diffuser located at the exit end of the open test section. The purpose of the diffuser is to decelerate the flow and thereby increase its pressure by a process called recovery.

The flow exiting from the contraction has a desired uniform profile and the resulting jet usually has a rectangular or oval shape. As the flow traverses the open test section it tends to develop an outer shear layer which ultimately leads to non-uniformity involving a mixing process. While the outer layer mixes with the surroundings, the uniform portion of the jet, called the jet core, diminishes in size. By the time the flow enters the diffuser the flow is usually far from being uniform which causes a loss in the pressure recovery, necessitating increased energy, e.g., fan power being needed to keep the flow moving.

One proposed correction of this non-uniformity is to use tabs or other similar devices located at the perimeter of the contraction exit in an effort to break up and weaken the shear layer surrounding the emerging jet stream. However, these tabs also tend to reduce the effective size of the jet core, which is often undesirable.

OBJECTS OF THE INVENTION

It is accordingly an object of the present invention to increase the pressure recovery of the first diffuser located after the open test section in a wind tunnel.

It is another object of the present invention to enhance the flow distribution in the open test section.

It is a further object of the present invention to reduce the demand for fan power in a wind tunnel.

It is yet another object of the present invention to achieve the foregoing objects while permitting simple, straight forward manufacture and installation of the necessary elements.

Additional objects and advantages of the present invention are apparent from the specification and drawings which follow.

SUMMARY OF THE INVENTION

The foregoing and additional objects are obtained by a nozzle diffuser according to the present invention. The nozzle diffuser has an inlet in fluid communication with the narrowed inlet of an open test chamber in a conventional wind tunnel. The nozzle has a passageway extending from its inlet to an outlet which is in communication with the open test section. The passageway has an internal cross-sectional area which increases from its inlet to its outlet and which may be defined by top and bottom isosceles trapezoid side walls of a particular flare angle and by isosceles trapezoid side walls of a different flare angle. In addition, a collector having a decreasing internal cross-sectional area from inlet to outlet may be provided at the opposite outlet end of the test chamber such that its outlet is in fluid communication with a diffuser located at the test chamber outlet end.

DETAILED DESCRIPTION OF THE PREFERRED EMBODIMENT

Figure 1:
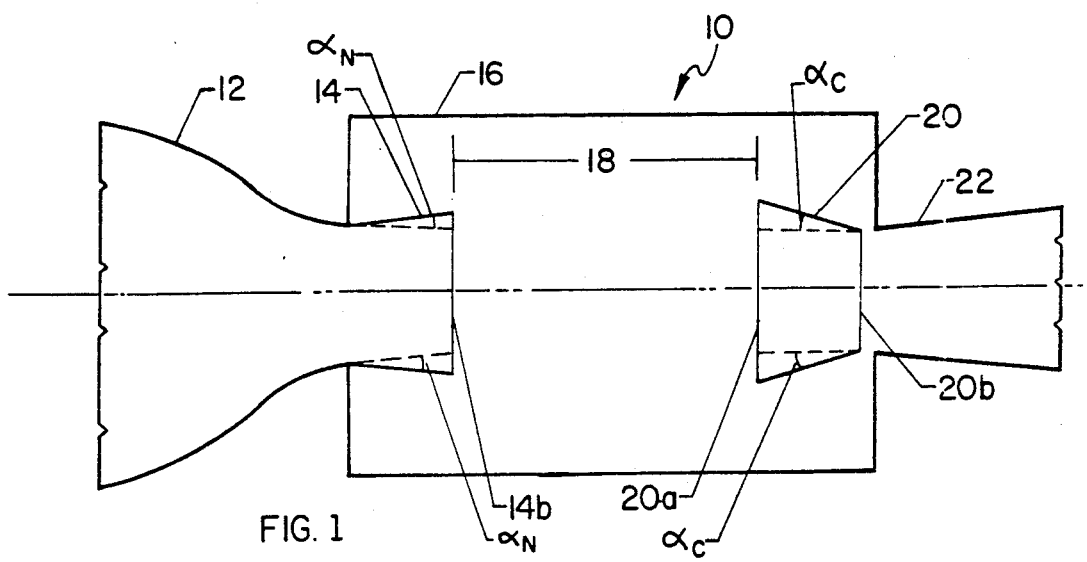
FIG. 1 is a schematic top view of a wind tunnel equipped with a nozzle diffuser and collector according to the present invention.

Referring to FIG. 1, a wind tunnel 10 is shown having a contracted feed section 12 having an inlet which is in communication with a motive section (not shown) supplying fan powered or otherwise powered air or other gas therethrough. A nozzle diffuser 14, discussed in greater detail below, is connected in a fluid tight manner to contraction 12 and extends into test chamber 16 at a first inlet end of chamber 16. An open test section 18 is defined within test chamber 16 between the terminal end 14b, i.e., the outlet end of nozzle diffuser 14, and the inlet end 20a of a collector 20 located at the opposite outlet end of test chamber 16. A model (not shown) is normally located within open test section 18 for desired aerodynamic testing. Collector 20 narrows from inlet end 20a to outlet end 20b to direct and accelerate the medium to an outlet diffuser 22 located at the opposite end of test chamber 16. Outlet diffuser 22 directs the gas through a closed circuit of any known configuration including the motive section in communication with contraction 12. Diffuser 22 has an entrance having a cross-sectional area equal to that of the exit of contraction 12, i.e., the point which nozzle diffuser 14 joins contraction 12 at inlet end 14a.

Figure 2:
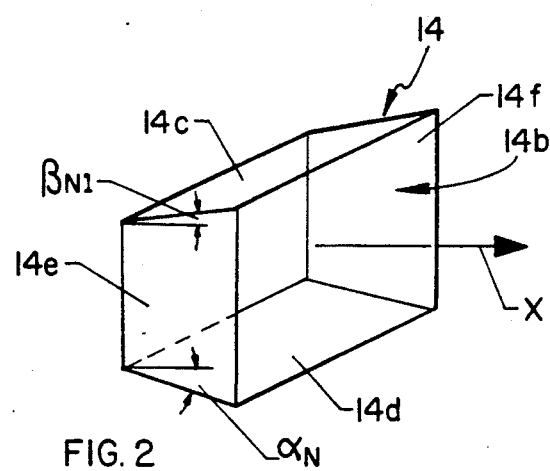
FIG. 2 is an isometric view of a nozzle diffuser according to the present invention.
Figure 3A:
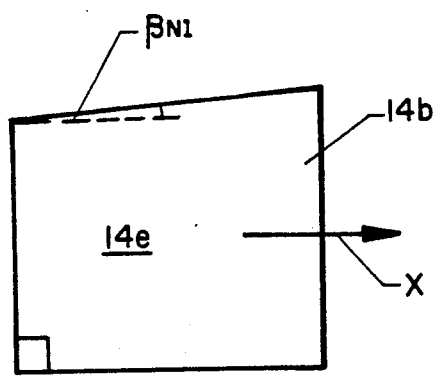
FIG. 3a is a side view of a nozzle diffuser side wall having a single upper profile flare $\beta_{N1}$.
Figure 3B:
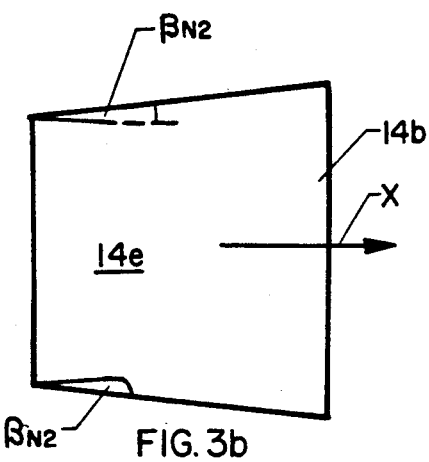
FIG. 3b is a side view of a nozzle diffuser side wall having equal upper and lower profile flares $\beta_{N2}$.

Referring now to FIG. 2, nozzle diffuser 14 is shown in greater detail. Nozzle diffuser 14 is basically a short duct having an open inlet end 14a and an open outlet end 14b. The duct flares open, i.e., its internal cross-sectional area increases, from inlet end 14a to outlet end 14b by the provision of top and bottom walls having a necessary shape. As shown specifically in FIG. 2, opposing top and bottom walls 14c and 14d each have a slight flare of angle $\alpha_N$ in the direction of airflow or gas flow, indicated by arrow X, from inlet end 14a to outlet end 14b such that the top and bottom form identical isoceles trapezoids. Similarly, opposing side walls 14e and 14f each have a slight flare of angle $\beta_N$ in the direction of airflow or other gas flow X from inlet end 14a to outlet end 14b. Referring to FIG. 3a, the top portion of the side walls can flare at angle $\beta_{N1}$ while the bottom portion of both side walls is parallel to air or other gas flow X. Alternatively, the top and bottom portions can flare equally at angle $\beta_{N2}$ such that the side walls also form isoceles trapezoids, as shown in FIG. 3b.

Figure 4A:
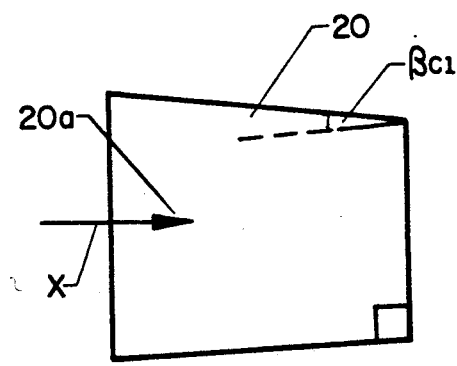
FIG. 4a is a side view of the collector having a single upper profile flare $\beta_{C1}$.
Figure 4B:
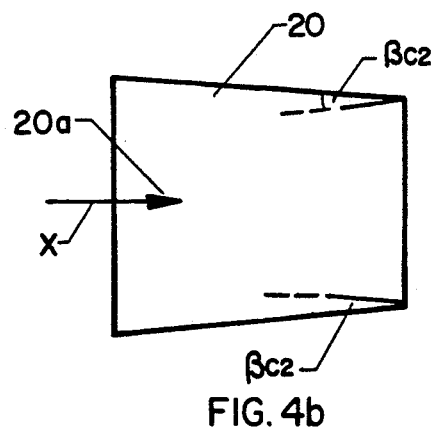
FIG. 4b is a side view of the collector having equal upper and lower profile flares $\beta_{C2}$.

Collector 20 has a similar shape with top and bottom walls having the shape of isoceles trapezoids that narrow from test section 18 to diffuser 22. The top and bottom walls each have a flare angle designated $\alpha_C$ and the side walls each have a flare angle designated $\beta_C$. As respectively shown in FIG. 4a and 4b, collector 20 has either a single top portion $\beta_{C1}$ and bottom parallel portions or equal top and bottom flares $\beta_{C2}$ forming an isoceles trapezoid. The collector flare embodiment should be the same as the nozzle diffuser flare embodiment so that the air flow profile shaped by the nozzle diffuser is recovered by the collector.

The optimum shape of the flow velocity profile traveling through the open test section 18 is very uniform such that the face of flow is nearly rectangular to correspond with the exit of the open test section, e.g., the flow profile approximates a closed test section wherein an uniform rectangular tube extends from the contracted inlet section to the outlet diffuser. A theoretical optimum model results in very slight flow blockage of, e.g., approximately 3%, and a very desirable pressure recovery of, e.g., 70%. Such optimum conditions can only be approximated in actual wind tunnel applications by attempting to reduce the boundary layer shape and hence reducing the curvature of the velocity profile.

Figure 5:
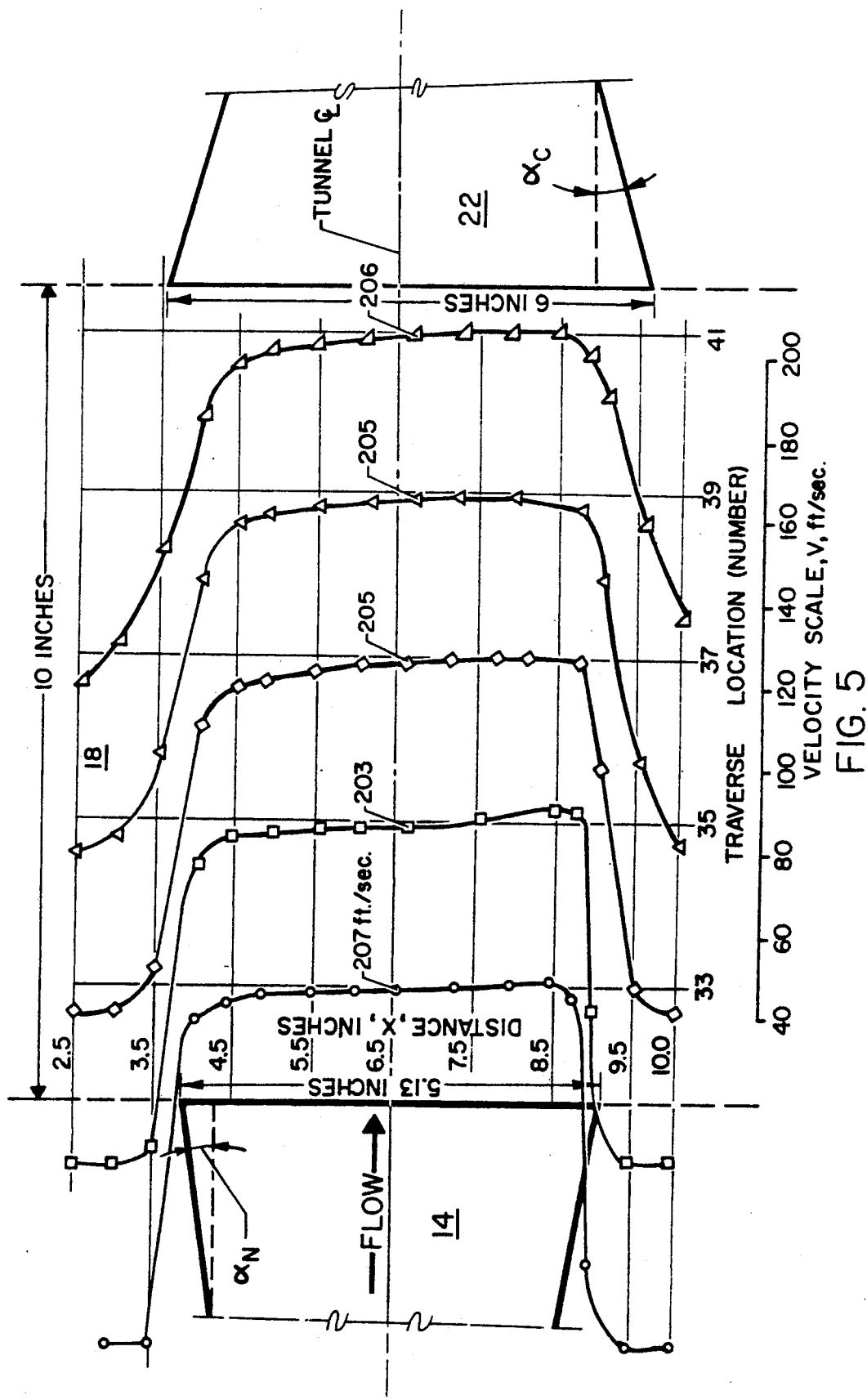
FIG. 5 is a plan view of the flow profiles generated by a nozzle diffuser according to the present invention.

The nozzle diffuser 14 was tested in the 1/60 scale, 4×7 Wind Tunnel at NASA Langley Research Center in Hampton, Va. This wind tunnel is similar to the tunnel depicted in FIG. 1. As shown in FIG. 5, the nozzle difuser 14 results in a reduction in the curvature of the velocity profile traveling from right to left in the open test section 18 toward collector 20 such that a more rectangular profile is formed. The profile is optimally rectangular with a boxed head end having an area which approximates the area of the outlet diffuser 22. The particular nozzle tested had isoceles trapezoidal top, bottom and said walls as in FIG. 2 wherein $\alpha_N \approx 6°$ and $\beta_{N2} \approx 2°$.

Similar effects are achieved by a single flare side wall embodiment and a dual flare side wall embodiment when the single flare angle approximately equals the sum of the two dual flare angles, i.e., $\beta_{N1} \approx 2\beta_{N2}$. Thus, any experimental data for one embodiment is applicable to the other embodiment by applying this relationship between the side flare angles. Accordingly, the results shown in FIG. 5 are approximated by a single side wall flare nozzle diffuser wherein $\alpha_N \approx 6°$ and $\beta_{N1} \approx 4°$. In this single side wall flare embodiment, the collector 20 would also have a single flare $\beta_{C1}$ as in FIG. 4b which would approximately double the $\beta_{C2}$ in the dual flare embodiment.

Figure 6:
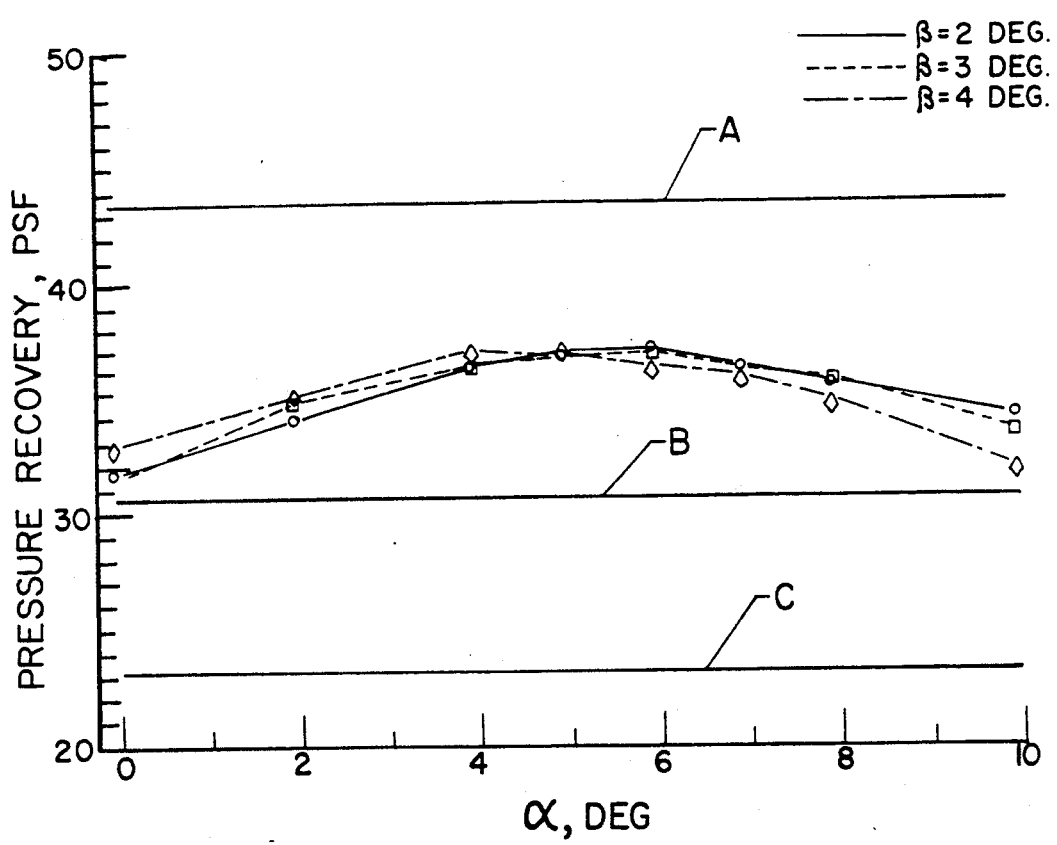
FIG. 6 is a graph showing the pressure recovery effect of various nozzle diffusers and other configurations in the diffuser.

Turning now to FIG. 6, the effect of nozzle diffuser 14 on the pressure recovery in diffuser 22 is shown. Line A represents the optimum pressure recovery for a closed test section. The remaining lines are for an open test section. Specifically, the curved lines represent the diffuser pressure recovery of three nozzle diffusers having dual side wall flare angles $\beta_{N2}$ of approximately two, three and four degrees. As represented by the X axis, the $\alpha_N$ angle was varied between zero and ten degrees for each of the three diffusers. In all embodiments, a standard collector was used wherein $\alpha_C \approx 15°$ and $\beta_{C2} \approx 10°$. Each nozzle diffuser configuration had a better pressure recovery than either an embodiment with only a collector 22 wherein $\alpha_C \approx 15°$ and $\beta_C \approx 10°$ and no nozzle diffuser, as represented by line B; or a standard embodiment with no collector or nozzle diffuser, as represented by line C. The optimum pressure recovery was achieved by a nozzle diffuser wherein $\alpha_N \approx 6°$ and $\beta_{N2} \approx 2°$ in conjunction with the above defined collector. As before, a single flare side $\beta_{N1}$ wall embodiment could be used, wherein $\beta_{N1} \approx 2\beta_{N2}$. This improved pressure recovery results in the driving fan of the motion section requiring less horsepower, thereby significantly reducing energy requirements.

Figure 7:
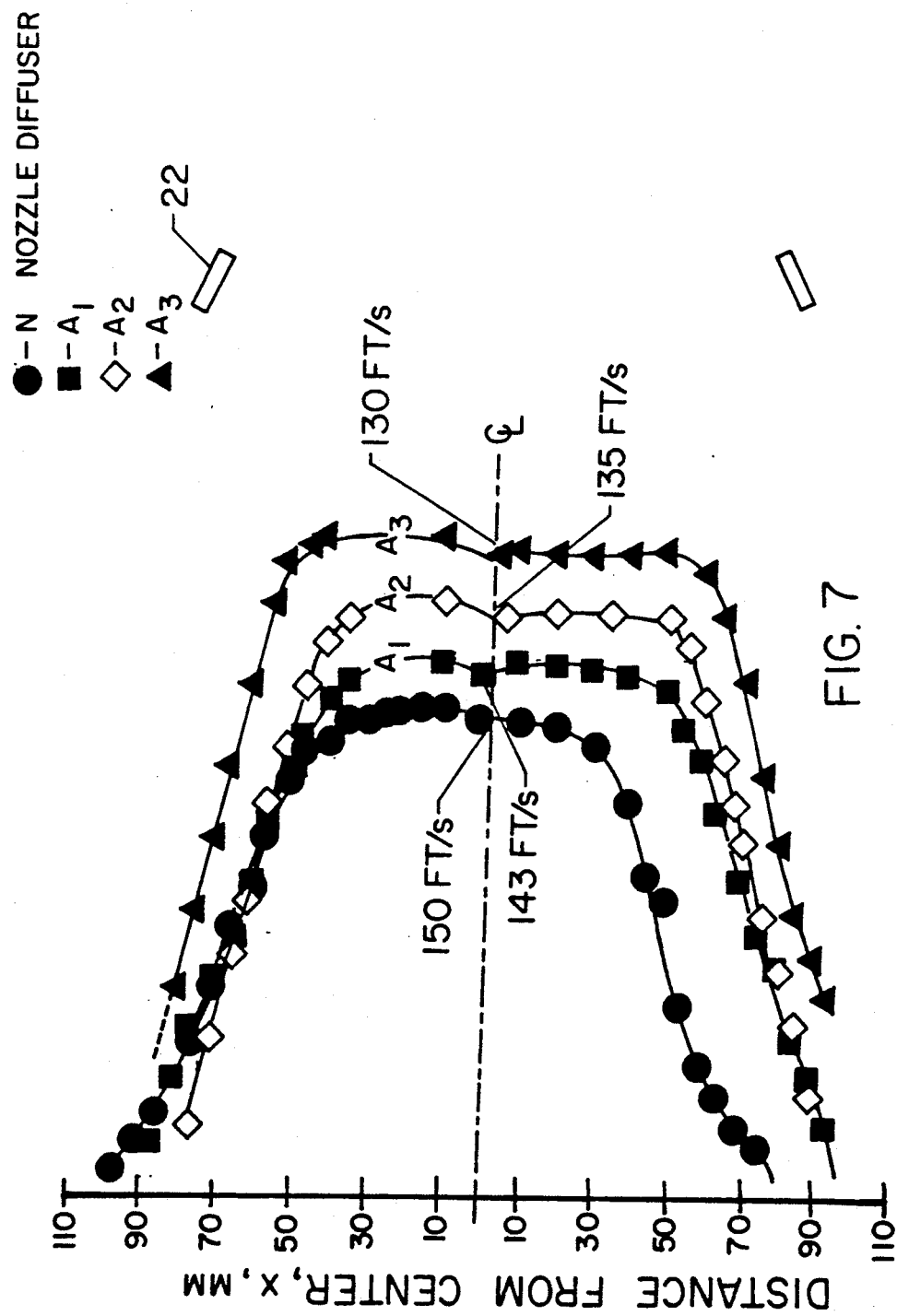
FIG. 7 is a plan view of the flow profiles of various nozzle diffusers and of a test section with no nozzle diffuser.

Referring to FIG. 7, the effects of a nozzle diffuser on the jet flow in an open test section at the entrance of collector 22 are shown. The flows plotted are generated from three nozzle embodiments and a standard open test section with a diffuser. A single side wall flare embodiment was used. The three nozzle dimensions are as follows:

TABLE 1

| Nozzle Diffuser Designation | $\alpha_N$ | $\beta_{N1}$ |
|---|---|---|
| $A_1$ | 6.4° | 7.1° |
| $A_2$ | 5.25° | 6.1° |
| $A_3$ | 5.7° | 6.5° |

Each nozzle diffuser embodiment has more desirable profile than the conventional test section without a nozzle diffuser. As before, the collector used was dimensioned such that $\alpha_C = 15°$ and $\beta_{C1} = 10°$.

The flaring of the nozzle diffuser is apparently a significant mechanism in the improved results of the present invention. The length and height of the diffuser nozzle are sufficient to establish a guide for the jet flow passing therethrough.

The nozzle diffuser shown in the drawings has a generally rectangular shape and flaring walls. However, the nozzle diffuser can have any geometrical shape so long as the effective internal cross-sectional area of the nozzle increases from the inlet end, connected to the test section inlet, to the outlet end opening to the test section. Such a geometric shape causes the gas emerging from the contracted section to be slightly diffused and therefore the flow velocity in the open test section is slightly reduced but still of sufficient magnitude for the particular testing parameters, e.g., a reduction for approximately 300 ft/sec in contracted section 12 to approximately 280 ft/sec upon exit from the nozzle diffuser. This velocity decrease in turn causes an increase in the flow width and a more uniform flow profile, thereby reducing blockage at the diffuser inlet near the test section outlet. Upon reaching the outlet end of the open test section at the collector, the gas flow is accelerated as it enters the first diffuser, e.g., back up to the initial velocity of approximately 300 ft. sec. This acceleration aids in improving the velocity distribution at the inlet, thereby further reducing blockage. The invention accordingly improves the pressure recovery in the first diffuser and reduces the energy requirement of the tunnel circuit.

Many modifications, improvements, and substitutions will become apparent to one skilled in the art without departing from the spirit and scope of the present invention as described herein and defined in the following claims.

What is claimed is:

1. In a wind tunnel comprising an open test chamber, a test chamber inlet having a defined internal area, and a test chamber outlet having a defined internal area approximately equal to that of the test chamber inlet, the improvement wherein a nozzle diffuser is provided at the test chamber inlet, said nozzle diffuser defining a passageway having an inlet which is in fluid communication with said test chamber inlet and an outlet in fluid communication with test chamber, the passageway having an internal cross-sectional area which increases from the passageway inlet to the passageway outlet, wherein the internal cross-sectional area of the passageway is sized to reduce a curvature of a velocity profile extending from the test inlet to the test chamber outlet to form a more rectangular velocity profile.

2. The improvement according to claim 1, wherein the passageway of said nozzle diffuser has an oppositely located top and bottom wall and two oppositely located side walls, the top and bottom walls flaring outwardly from the inlet to the outlet at a predetermined angle, the two side walls flaring outwardly from the inlet to the outlet at another predetermined angle.

3. The improvement according to claim 1, wherein the nozzle passageway comprises oppositely located top and bottom walls and two oppositely located side walls, the top and bottom walls each defining an isosceles trapezoid having a predetermined flare angle, the side walls each defining an isosceles trapezoid having another predetermined flare angle.

4. The improvement according to claim 1, further comprising a collector provided at the test chamber outlet having an inlet in fluid communication with the test section outlet, said collector having an internal cross-sectional area which decreases from the collector inlet to the collector outlet.

5. The improvement according to claim 4, wherein said collector comprises oppositely located top and bottom walls and two oppositely located side walls, the top and bottom walls each defining an isosceles trapezoid having a predetermined flare angle, the side walls each defining an isosceles trapezoid having another predetermined flare angle.

6. The improvement according to claim 4, wherein said collector comprises oppositely located top and bottom walls which each define an isosceles trapezoid having a predetermined flare angle and oppositely located side walls each which also have a top portion that flares at another predetermined angle.

7. The improvement according to claim 4, wherein said collector comprises oppositely located top and bottom walls and two oppositely located side walls, the top and bottom walls each defining an isosceles trapezoid having a predetermined flare angle, the side walls each defining an isosceles trapezoid having another predetermined flare angle.

8. The improvement according to claim 1, wherein the test chamber inlet narrows prior to said nozzle diffuser.

9. The improvement according to claim 1, wherein the passageway comprises oppositely located top and bottom walls and two oppositely located side walls, the top and bottom walls each defining an isosceles trapezoid having the same predetermined flare angle, and a top portion of each side wall flares at another predetermined flare angle.

10. The improvement according to claim 9, further comprising a collector provided at the test chamber outlet having an inlet in fluid communication with the test section outlet, said collector having an internal cross-sectional area which decreases from the collector inlet to the collector outlet.

11. The improvement according to claim 10, wherein said collector comprises oppositely located top and bottom walls which each define an isosceles trapezoid having a predetermined flare angle and oppositely located side walls each which also have a top portion that flares at another predetermined angle.

12. The improvement according to claim 1, wherein said nozzle diffuser inlet is connected to the test chamber inlet in a fluid tight manner.

13. In a wind tunnel comprising an open test chamber, a test chamber inlet, and a test chamber outlet, the improvement wherein a nozzle diffuser is provided at the test chamber inlet, said nozzle diffuser defining a passageway having an inlet which is in fluid communication with said test chamber inlet and an outlet in fluid communication with test chamber, the passageway having an internal cross-sectional area which increases from the passageway inlet to the passageway outlet; and
a collector provided at the test chamber outlet having an inlet in fluid communication with the test section outlet, said collector having an internal cross-sectional area which decreases from the collector inlet to the collector outlet, wherein said collector comprises oppositely located top and bottom walls and two oppositely located side walls, the top and bottom walls each defining an isosceles trapezoid having a predetermined flare angle, the side walls each defining an isosceles trapezoid having another predetermined flare angle.

14. In a wind tunnel comprising an open test chamber, a test chamber inlet, and a test chamber outlet, the improvement wherein a nozzle diffuser is provided at the test chamber inlet, said nozzle diffuser defining a passageway having an inlet which is in fluid communication with said test chamber inlet and an outlet in fluid communication with test chamber, the passageway having an internal cross-sectional area which increases from the passageway inlet to the passageway outlet; and
a collector provided at the test chamber outlet having an inlet in fluid communication with the test section outlet, said collector having an internal cross-sectional area which decreases from the collector inlet to the collector outlet, wherein said collector comprises oppositely located top and bottom walls which each define an isosceles trapezoid having a predetermined flare angle and oppositely located side walls each which also have a top portion that flares at another predetermined angle.

* * * * *